United States Patent
Nomura

(10) Patent No.: US 8,188,407 B2
(45) Date of Patent: May 29, 2012

(54) TEMPERATURE CONTROL APPARATUS, PROCESSING APPARATUS, AND TEMPERATURE CONTROL METHOD

(75) Inventor: Masatoshi Nomura, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 916 days.

(21) Appl. No.: 12/237,584

(22) Filed: Sep. 25, 2008

(65) Prior Publication Data

US 2009/0084771 A1 Apr. 2, 2009

(30) Foreign Application Priority Data

Sep. 28, 2007 (JP) .................................. 2007-255100

(51) Int. Cl.
*F23Q 7/00* (2006.01)

(52) U.S. Cl. ........................................ 219/263; 219/260

(58) Field of Classification Search ........... 219/260–270
See application file for complete search history.

(56) References Cited

U.S. PATENT DOCUMENTS

| | | | | |
|---|---|---|---|---|
| 4,456,817 A | * | 6/1984 | Mehnert et al. | 219/263 |
| 5,632,614 A | * | 5/1997 | Consadori et al. | 431/79 |
| 6,803,544 B1 | * | 10/2004 | Zikes et al. | 219/263 |
| 7,459,840 B2 | * | 12/2008 | Pyun et al. | 313/403 |
| 8,022,336 B2 | * | 9/2011 | Casasso et al. | 219/262 |
| 2009/0008378 A1 | * | 1/2009 | Kernwein et al. | 219/260 |
| 2009/0084771 A1 | * | 4/2009 | Nomura | 219/263 |

FOREIGN PATENT DOCUMENTS

| | | |
|---|---|---|
| JP | 9-306638 A | 11/1997 |
| JP | 11-006812 A | 1/1999 |
| JP | 2005-108557 A | 4/2005 |
| JP | 2005-314207 A | 11/2005 |

OTHER PUBLICATIONS

Japanese Office Action dated Feb. 1, 2011 and English translation thereof in counterpart Japanese Application No. 2007-255100.

* cited by examiner

*Primary Examiner* — Daniel L Robinson
(74) *Attorney, Agent, or Firm* — Holtz, Holtz, Goodman & Chick, PC

(57) ABSTRACT

Disclosed is an temperature control apparatus including: a resistance heater a resistance value of which changes dependently on a temperature thereof; a fixed resistance connected to the resistance heater in series; a signal generator to output a control signal which has two voltage levels of a first voltage and a second voltage; a switching section to flow a current through the resistance heater and the fixed resistance when the voltage level is the first voltage, and not to flow a current through the resistance heater and the fixed resistance when the voltage level is the second voltage; and a first voltage measuring instrument to measure a voltage value across the fixed resistance at the time when the current flows through the fixed resistance, wherein the signal generator controls the temperature of the resistance heater based on the measured voltage by the first voltage measuring instrument.

22 Claims, 6 Drawing Sheets

TEMPERATURE CONTROL APPARATUS, PROCESSING APPARATUS, AND TEMPERATURE CONTROL METHOD

BACKGROUND OF THE INVENTION

1. Field of the Invention

The present invention relates to a temperature control apparatus, a processing apparatus, and a temperature control method, and particularly to a temperature control apparatus including a resistance heater for heating devices and controlling a temperature of the resistance heater, a processing apparatus including the temperature control apparatus, and a method for controlling the temperature.

2. Description of Related Art

In recent years, a fuel cell has attracted attention as a clean power source having high energy conversion efficiency, and the practical application of the fuel cell to a fuel cell powered vehicle, an electric home, and the like, has been advanced. Moreover, the research and development for using a fuel cell as a power source also in portable electronic equipment, such as a cellular phone and a notebook-size personal computer, has advanced.

A fuel cell is a device for producing electric power by electrochemical reactions between hydrogen and oxygen. The hydrogen to be supplied to the fuel cell is produced from, for example, a liquid fuel, such as methanol. In this case, a reaction apparatus for producing the hydrogen from a liquid fuel and water is connected to the fuel cell.

The reaction apparatus is composed of, for example, a vaporizer to vaporize a liquid fuel and water, a reformer to cause the reforming reaction of the vaporized fuel and water to produce hydrogen, and a carbon monoxide remover to remove the carbon monoxide infinitesimally produced in the reformer by means of the oxidization thereof. As such a reaction apparatus, a reaction apparatus integrally forming the reformer and the carbon monoxide remover was also developed. Specifically, the reaction apparatus is composed of a joined body of a plurality of substrates, grooves are formed on the joint surfaces of these substrates, catalysts are carried on the wall surfaces of the grooves, and the substrates are joined with one another so that the grooves may be covered by the substrates to function as the flow paths of the reformer and the carbon monoxide remover.

Moreover, since the reformer and the carbon monoxide remover have temperatures at which the reaction occurs efficiently and the temperatures are higher than a room temperature, it is necessary to heat the reformer and the carbon monoxide remover, and to control the temperature of the reformer or of the carbon monoxide remover so as to maintain the optimum temperature thereof.

In order to keep the temperatures of the reformer and the carbon monoxide remover at the optimum temperatures, it is general to use a feedback control method. That is, the reformer and the carbon monoxide remover are heated by a resistance heater; the temperatures of the reformer and the carbon monoxide remover are measured with temperature sensors, such as thermocouples; the measured temperatures are fed back; and the electric power to be supplied to the resistance heater is controlled on the basis of the measured temperatures. The reformer and the carbon monoxide remover can be thereby kept at the optimum temperatures.

Moreover, if the resistance value of the resistance heater depends on the temperature, then the temperature can be measured on the basis of the resistance value of the resistance heater, thereby the temperature sensor can be omitted. In this case, the current flowing through the resistance heater is controlled while the voltage across the resistance heater is measured with an operational amplifier and the like. In other words, a magnitude of the current to be applied to the resistance heater is set; the current of the magnitude is flown through the resistance heater; and the voltage across the resistance heater is measured with the operational amplifier to be fed back. The resistance value of the resistance heater is then obtained from the set magnitude of the current and the measured voltage, thereby the temperature of the resistance heater is also obtained. The magnitude of the current is newly set on the basis of the obtained resistance value or the obtained temperature, and the current of the newly set magnitude is flown through the resistance heater.

However, since a certain power source voltage is generally applied to a circuit including a resistance heater, even when the current flowing through the resistance heater is adjusted, electric power is consumed in some part other than the resistance heater so that heat is produced in the circuit by the consumption of the useless electric power.

Moreover, if the current of the resistance heater is enlarged, then the response voltage across the resistance heater also becomes larger. It becomes necessary to widen the range of the input voltage across operational amplifier for measuring the response voltage across the resistance heater, or to divide the input voltage and to attenuate the divided voltages in respective voltage ranges with an attenuator or the like, accordingly. The resolution capability of the measurement of the response voltage across the resistance heater falls and the causes of errors of the measurement increase.

SUMMARY OF THE INVENTION

It is an object of the present invention, in a temperature control apparatus to control a temperature of a resistance heater for heating which has a characteristic that a resistance value changes dependently on a temperature, a processing apparatus including the temperature control apparatus, and a method for controlling the temperature, to suppress the power consumption, and to suppress the falling of the resolution capability and increase of the errors in measuring a voltage across a resistance heater.

To achieve above object, the temperature control apparatus of the present invention includes a resistance heater having characteristics that a resistance value of the resistance heater changes dependently on a temperature thereof; a fixed resistance connected to the resistance heater in series; a signal generator to output a control signal which has two voltage levels of a first voltage and a second voltage; a switching section to flow a current through the resistance heater and the fixed resistance when the voltage level of the control signal is the first voltage, and not to flow a current through the resistance heater and the fixed resistance when the voltage level of the control signal is the second voltage; and a first voltage measuring instrument to measure a voltage value across the fixed resistance at the time when the current flows through the fixed resistance, wherein the signal generator controls the temperature of the resistance heater based on the measured voltage by the first voltage measuring instrument.

To achieve above object, the processing apparatus of the present invention, supplied a raw material, subjected to temperature control thereof, causing a reaction or a phase change of the raw material, the apparatus includes: a processing device to cause the reaction or the phase change of the raw material; and a temperature control apparatus including: a resistance heater provided in the processing device to heat the processing device, the resistance heater having characteristics such that a resistance value of the resistance heater changes dependently on a temperature thereof; a fixed resistance connected to the resistance heater in series; a signal generator to output a control signal which has two voltage levels of a first voltage and a second voltage; a switching section to flow a current through the resistance heater and the fixed resistance when the voltage level of the control signal is the first voltage, and not to flow a current through the resistance heater and the fixed resistance when the voltage level of the control signal is the second voltage; and a first voltage measuring instrument to measure a voltage value across the fixed resistance at the time when the current flows through the fixed resistance, wherein the signal generator controls the temperature of the resistance heater based on the measured voltage by the first voltage measuring instrument.

To achieve above object, the temperature control method of the present invention for controlling a temperature of the resistance heater having characteristics that a resistance value of the resistance heater changes dependently on a temperature thereof, the temperature control method includes: outputting a control signal which switches between the voltage levels of a first voltage and a second voltage; flowing a current through the resistance heater and the fixed resistance connected to the resistance heater in series when the voltage level of the control signal is the first voltage and shutting off a current flowing through the resistance heater and the fixed resistance when the voltage level of the control signal is the second voltage; measuring a voltage value across the fixed resistance at the time when the control signal is in the first voltage; and controlling the control signal based on the voltage value measured by the measuring step to control the temperature of the resistance heater.

BRIEF DESCRIPTION OF THE DRAWINGS

The present invention will become more fully understood from the following detailed description and the appended drawings, and thus are not intended as a definition of the limits of the invention, and wherein.

DETAILED DESCRIPTION OF THE PREFERRED EMBODIMENTS

In the following, the preferable embodiments of a temperature control apparatus, a processing apparatus and a temperature control method according to the present invention will be described with reference to the attached drawings. Incidentally, technically preferable various limitations for embodying the present invention are put on the embodiments described below, but the limitations are not intended to limit the scope of the present invention to the following embodiments and shown examples.

Firstly, generating equipment to which the temperature control apparatus of the present invention can be applied will be described.

Figure 1:
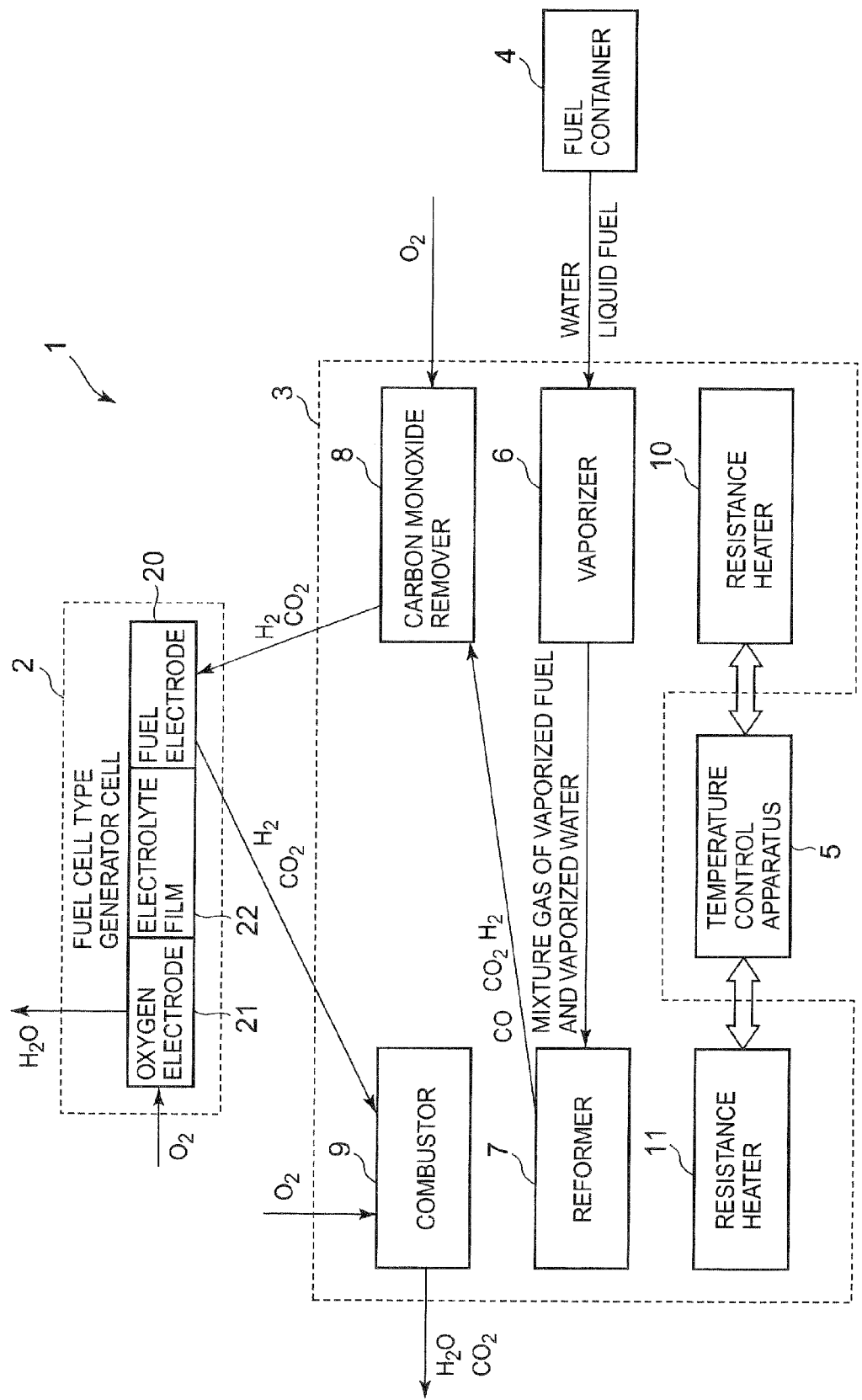
FIG. 1 is a block drawing showing a schematic configuration of generating equipment provided with a temperature control apparatus according to the present invention.

FIG. 1 is a block drawing showing a schematic configuration of generating equipment provided with a temperature control apparatus according to the present invention.

The generating equipment 1 is the equipment to be equipped in electronic equipment such as a notebook-size personal computer, a cellular phone, a personal digital assistant (PDA), an electronic organizer, a wrist watch, a digital still camera, a digital video camera, a game instrument, and amusement equipment, and is the equipment to be used as a power source for operating the main body of the electronic equipment.

The generating equipment 1 is composed of a fuel cell type generator cell 2, a reaction apparatus body 3, and a fuel container 4. The fuel container 4 reserves liquid fuel (for example, methanol, ethanol, dimethyl ether, or gasoline) and water in a separate state or a mixed state therein. The fuel and the water are supplied to the reaction apparatus body 3 by a not-shown pump in a mixed state. Incidentally, the fuel in the fuel container 4 is methanol in FIG. 1.

The reaction apparatus body 3 is composed of a vaporizer 6, a reformer 7, a carbon monoxide remover 8, a combustor 9, and resistance heaters 10 and 11.

The vaporizer 6, the reformer 7, the carbon monoxide remover 8, the combustor 9, and the resistance heaters 10 and 11 are housed in a heat insulating package having an enclosed space, and the dissipation of thermal energy is suppressed by the heat insulating package.

The fuel and the water supplied from the fuel container 4 to the reaction apparatus body 3 are first sent to the vaporizer 6. The fuel and the water are vaporized by the vaporizer 6, and the mixture gas of the fuel and the water are sent to the reformer 7. An endothermic reaction is caused by a vaporization by the vaporizer 6, and the heat of the reactions of the carbon monoxide remover 8 and the heat of the resistance heater 10 are used for the vaporization in the vaporizer 6.

The reformer 7 produces a hydrogen gas and the like from the vaporized water and the vaporized fuel by a catalyst reaction, and produces a carbon monoxide gas although the quantity thereof is infinitesimal. If the fuel is methanol, then the chemical reactions expressed by the following formulae (1) and (2) are caused in the reformer 7.

The reforming reactions in the reformer 7 are endothermic reactions, and the temperature suitable for the reforming reactions is about 280° C., which is higher than a room temperature. The combustion heat of the combustor 9 and the heat of the resistance heater 11 are used for the reforming reactions in the reformer 7, accordingly.

$$CH_3OH + H_2O \rightarrow 3H_2 + CO_2 \tag{1}$$

$$H_2 + CO_2 \rightarrow H_2O + CO \tag{2}$$

The hydrogen gas and the like, which have been produced in the reformer 7, are sent to the carbon monoxide remover 8, and the air on the outside is sent to the carbon monoxide remover 8. The carbon monoxide remover 8 selectively removes the by-produced carbon monoxide by preferentially oxidizing it with a catalyst. In the following, the mixture gas from which the carbon monoxide has been removed is referred to as a reformed gas. The reaction of oxidizing the carbon monoxide is a heat generation reaction, but the carbon monoxide remover 8 is heated by the resistance heater 10 when the temperature of the carbon monoxide remover 8 does not reach the optimum temperature because the temperature suitable for the selective oxidation reaction in the carbon monoxide remover 8 is higher than the room temperature.

The fuel cell type generator cell 2 is configured of a fuel electrode 20, an oxygen electrode 21, and an electrolyte film 22 put between the fuel electrode 20 and the oxygen electrode 21. The reformed gas sent from the carbon monoxide remover 8 is supplied to the fuel electrode 20 of the fuel cell type generator cell 2, and further the air on the outside is sent to the oxygen electrode 21. The hydrogen in the reformed gas supplied to the fuel electrode 20 then electrochemically reacts with the oxygen in the air supplied to the oxygen electrode 21 through the electrolyte film 22, and electric power is generated between the fuel electrode 20 and the oxygen electrode 21. The electric power extracted from the fuel cell type generator cell 2 is supplied to the main body of the electronic equipment, and the electric power is stored in the secondary battery in the main body of the electronic equipment, or a load (liquid crystal display or the like) of the main body of the electronic equipment is operated by the electric power.

If the electrolyte film 22 is the one having the hydrogen ion permeability (for example, a solid polymer electrolyte film), then the reaction expressed by the following formula (3) is caused at the fuel electrode 20, and the hydrogen ions produced at the fuel electrode 20 permeate the electrolyte film 22 to cause the reaction expressed by the following formula (4) at the oxygen electrode 21.

$$H_2 \rightarrow 2H^+ + 2e^- \tag{3}$$

$$2H^+ + 1/2O_2 + 2e^- \rightarrow H_2O \tag{4}$$

On the other hand, if the electrolyte film 22 is the one having oxygen ion permeability (for example, a solid oxide electrolyte film), then the reaction expressed by the following formula (5) is caused at the oxygen electrode 21, and the oxygen ions produced at the oxygen electrode 21 permeate the electrolyte film 22 to cause the reaction expressed by the following formula (6) at the fuel electrode 20.

$$1/2O_2 + 2e^- \rightarrow 2O^{2-} \tag{5}$$

$$H_2 + 2O^{2-} \rightarrow H_2O + 2e^- \tag{6}$$

The hydrogen gas and the like that have not electrochemically reacted at the fuel electrode 20 to remain as they are sent to the combustor 9. Furthermore, the air on the outside is sent to the combustor 9. The combustor 9 mixes the hydrogen gas (offgas) and oxygen to burn the mixed gas by a catalyst reaction.

Both of the resistance heaters 10 and 11 are made of electric heating materials (electrical resistance materials), such as gold. The resistance heaters 10 and 11 each have a characteristic such that their resistance values change dependently on their temperatures, and a proportionality relation is particularly concluded between the temperatures and the resistance values. Consequently, the resistance heaters 10 and 11 also function as temperature sensors to read their temperatures from their resistance values. The temperatures measured with the resistance heaters 10 and 11 are fed back to a temperature control apparatus 5, and the temperature control apparatus 5 controls the heating values of the resistance heaters 10 and 11 on the basis of the measured temperatures.

In the reaction apparatus body 3, for example, the carbon monoxide remover 8 and the vaporizer 6 are laminated on each other and the resistance heater 10 is mounted on the combined body of the carbon monoxide remover 8 and the vaporizer 6. Thus, the carbon monoxide remover 8 and the vaporizer 6 are heated by the resistance heater 10. Moreover, for example, the reformer 7 and the combustor 9 are laminated on each other and the resistance heater 11 is mounted on the combined body of the reformer 7 and the combustor 9. In this case, the reformer 7 is heated by the combustor 9 and the resistance heater 11. The combined body of the reformer 7 and the combustor 9 is coupled with the combined body of the carbon monoxide remover 8 and the vaporizer 6 by the bridge section and heat is conducted through the bridge section. A flow path for flowing hydrogen and the like from the reformer 7 to the carbon monoxide remover 8 is formed in the bridge section.

[First Embodiment]

Next, the first embodiment of the temperature control apparatus according to the present invention will be described specifically.

Figure 2A:
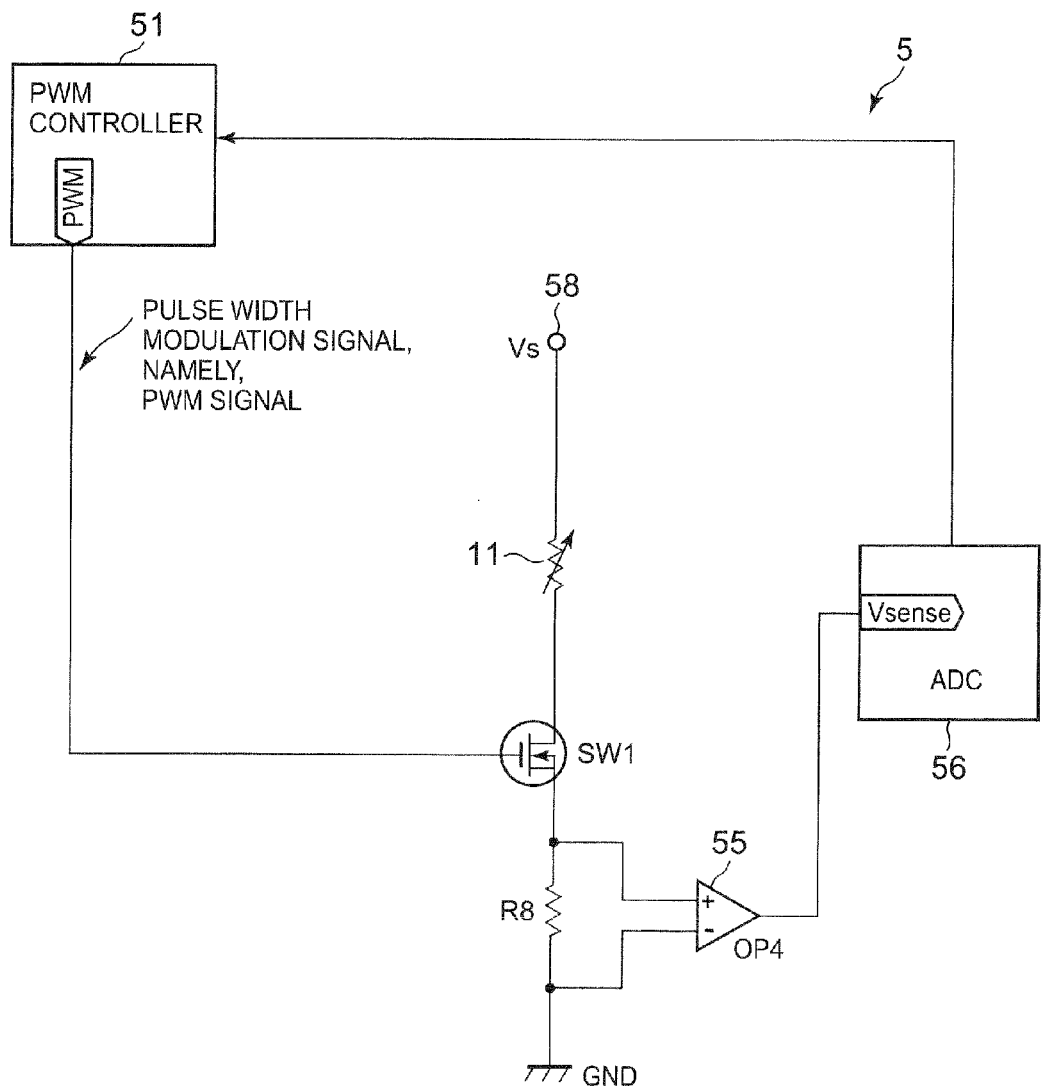
FIG. 2A is a circuit drawing showing a circuit configuration of the temperature control apparatus according to the first embodiment of the present invention.
Figure 2B:
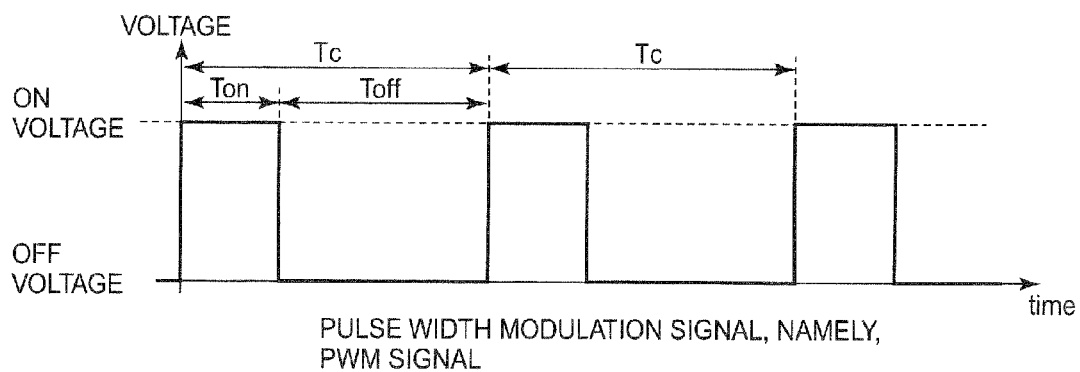
FIG. 2B is a chart showing a wave pattern of a control signal.

FIGS. 2A, 2B are circuit drawings showing a circuit configuration of the temperature control apparatus according to the first embodiment of the present invention, and showing a wave pattern of a control signal.

Incidentally, although FIG. 2A shows the circuit drawing of the resistance heater 11, the resistance heater 10 has same configuration as the resistance heater 11.

The temperature control apparatus 5 according to this embodiment is composed of a PWM controller 51, a differential amplifier 55 including an operational amplifier OP4 and the like, an analog to digital converter (hereinafter briefly referred to as ADC) 56, a PWM switch SW1, a fixed resistance R8, and a resistance heater 11. Incidentally, "PWM" is an abbreviation of "Pulse Width Modulation".

The PWM controller 51 includes, for example, a central processing unit (CPU), ROM, and the like. The PWM controller 51 performs various control operations based on a program stored in the ROM, and the like.

Specifically, the PWM controller 51 generates, as a control signal to be applied to the PWM switch SW1, according to a digital signal supplied from the ADC 56, a width modulation signal (hereinafter referred to as a PWM signal) of certain period pulse ($T_c$) as shown in FIG. 2B, which switches between an on voltage (first voltage) and an off voltage (second voltage), and outputs the generated PWM signal.

In other words, the PWM controller 51 controls the duty ratio of the PWM signal which is a ratio between a time ($T_{on}$) during on voltage and a time ($T_{off}$) during the off voltage in one period of the PWM signal, by controlling the length of the time ($T_{on}$) at the time when the PWM signal is in on voltage on the basis of a signal fed back from the ADC 56.

The PWM signal output from the PWM controller 51 has a predetermined voltage value, and the level (voltage value) of the PWM signal changes when the PWM signal is in on voltage and when the PWM signal is in the off voltage. In concrete terms, when the PWM signal is in on voltage, the polarity of the level (voltage value) is positive and the PWM signal has a predetermined high level voltage value, and when the PWM signal is in the off voltage, the level is low, for example, zero [V].

The PWM switch SW1 is an enhancement type n-channel MOSFET, and the output terminal of the PWM controller 51 is connected to a gate electrode of the PWM switch SW1, and the PWM signal is applied to the gate electrode.

The resistance heater 11, the PWM switch SW1 and the fixed resistance R8 are connected to one another in series between the power source input terminal 58 and the ground. Specifically, the resistance heater 11 is connected between a drain electrode of the PWM switch SW1 and the power source input terminal 58, and the fixed resistance R8 is connected between a source electrode of the PWM switch SW1 and the ground. The resistance value of the fixed resistance R8 is known value. Incidentally, as long as the resistance heater 11, the PWM switch SW1 and the fixed resistance R8 are connected to one another in series between the power source input terminal 58 and the ground, their alignment sequence is not limited to the one shown in FIG. 2. Moreover, the PWM switch SW1 may not be the MOSFET, but may be a bipolar transistor.

A direct-current constant voltage $V_s$ is applied to the power source input terminal 58. Then the PWM signal output from the PWM controller 51 is input into the gate electrode of the PWM switch SW1, and the PWM switch SW1 operates according to the PWM signal from the PWM controller 51.

That is, when the PWM signal input into the gate electrode of the PWM switch SW1 is in on voltage and high level voltage, the PWM switch SW1 becomes on voltage and the part from the power source input terminal 58 to the ground turns to an electrified state. Thus, the current flows from the power source input terminal 58 to the ground through the resistance heater 11, the PWM switch SW1 and the fixed resistance R8. By this, the resistance heater 11 generates heat.

On the other hand, when the PWM signal input into the gate electrode of the PWM switch SW1 is in off voltage and zero V, the PWM switch SW1 becomes its off status. When the PWM switch SW1 becomes its off status, a current is shut off and does not flow from the power source input terminal 58 to the ground.

As described above, the time period that a current flows through the resistance heater 11 (time period of on voltage) is controlled by the control of the duty ratio of the PWM signal by the PWM controller 51, and the heating quantity of the resistance heater 11 is adjusted.

The differential amplifier 55 outputs a signal indicating the voltage which is potential difference between both terminals of the fixed resistance R8 to the ADC 56. Incidentally, because the differential amplifier 55 is a known circuit, the illustration of the components, such as the feedback resistance and the like, of the differential amplifier 55 other than the operational amplifier OP4 is omitted.

Here, a current flowing through the fixed resistance R8 is unambiguously obtained from the voltage across the fixed resistance R8 measured by the differential amplifier 55.

In other words, the current is presented by the formula of (the current flowing through the fixed resistance R8)=(the voltage across the fixed resistance R8 measured by the differential amplifier 55)/(the resistance value of the fixed resistance R8).

Moreover, since the fixed resistance R8, the PWM switch SW1 and the resistance heater 11 are connected to one another in series, the current flowing through the fixed resistance R8 and the current flowing through the resistance heater 11 are equal.

Furthermore, since the fixed resistance R8, the PWM switch SW1 and the resistance heater 11 are connected to one another in series and the voltage across the power source input terminal 58 is the constant voltage $V_s$, the voltage across the resistance heater 11 is unambiguously obtained from the voltage across the fixed resistance R8.

In other words, the voltage is presented by the formula of (the voltage across the resistance heater 11)=(the constant voltage $V_s$)−(the voltage across the fixed value R8 measured by the differential amplifier 55).

Here, because the resistance value of the PWM switch SW1 in the on status is extremely small in comparison with the resistance values of the fixed resistance R8 and the resistance value of the resistance heater 11, it is considered that a source-drain voltage of the PWM switch SW1 is zero.

If the resistance value of the PWM switch SW1 in on voltage is not small so as not to be able to be ignored in comparison with the resistance vales of the fixed value R8 and the resistance heater 11, the voltage is presented by the formula of (the voltage across the resistance heater 11)=(the constant voltage $V_s$)−(the voltage across the fixed resistance R8 measured by the differential amplifier 55)−(the voltage across the PWM switch SW1 in the on status).

By this, the resistance value, the power consumption and the like of the resistance heater 11 are unambiguously obtained from the voltage across the fixed resistance R8.

In other words, the resistance value is presented by the formula of (the resistance value of the resistance heater 11)={(the constant voltage $V_s$)−(the voltage across the fixed value R8 measured by the differential amplifier 55)}×(the resistance value of the fixed resistance R8)/(the voltage across the fixed resistance R8 measured by the differential amplifier 55), and the power consumption is presented by the formula of (the power consumption of the resistance heater 11)=(the voltage across the resistance heater 11)×(the current flowing through the resistance heater 11)={(the constant voltage $V_s$)−(the voltage across the fixed resistance R8 measured by the differential amplifier 55)}×(the voltage across the fixed resistance R8 measured by the differential amplifier 55)/(the resistance value of the fixed resistance R8).

On the other hand, if the voltage across the PWM switch SW1 in the on status is not ignored, the resistance value is presented by the formula of (the resistance value of the resistance heater 11)={(the constant voltage $V_s$)−(the voltage across the fixed resistance R8 measured by the differential amplifier 55)−(the voltage across the PWM switch SW1 in the on status)}×(the resistance value of the fixed resistance R8)/(the voltage across the fixed resistance R8 measured by the differential amplifier 55), and the power consumption is presented by the formula of (the power consumption of the resistance heater 11)=(the voltage across the resistance heater 11)×(the current flowing through the resistance heater 11)={(the constant voltage $V_s$)−(the voltage across the fixed resistance R8 measured by the differential amplifier 55) (the voltage across the PWM switch SW1 in the on status)}×(the voltage across the fixed resistance R8 measured by the differential amplifier 55)/(the resistance value of the fixed resistance R8).

In addition, since the resistance heater 11 has a characteristic that the resistance value thereof changes dependently on a temperature, the temperature of the resistance heater 11 is unambiguously obtained from the voltage across the fixed resistance R8.

The ADC 56 converts the signal input from the differential amplifier 55 from analog to digital, and outputs a digital signal representing the voltage across the fixed resistance R8 to the PWM controller 51. As described above, the digital signal input to the PWM controller 51 represents the voltage across the fixed resistance R8 as well as the current flowing through the fixed resistance R8 and the resistance heater 11 and the resistance value of the resistance heater 11. Incidentally, the ADC 56 may be embedded with the PWM controller 51 and the PWM controller 51 and the ADC 56 may be made into one chip.

The PWM controller 51 reads the resistance value of the resistance heater 11 from the feedback signal from the ADC 56 when the PWM signal is in on voltage, and recognizes the temperature of the resistance heater 11 from the resistance value.

The PWM controller 51 obtains a new duty ratio based on the resistance value of the resistance heater 11 at the time when the PWM signal is in on voltage, and outputs the PWM signal of the new duty ratio to the PWM switch SW1.

Next, an operation of the temperature control apparatus 5 will be described.

Figure 3:
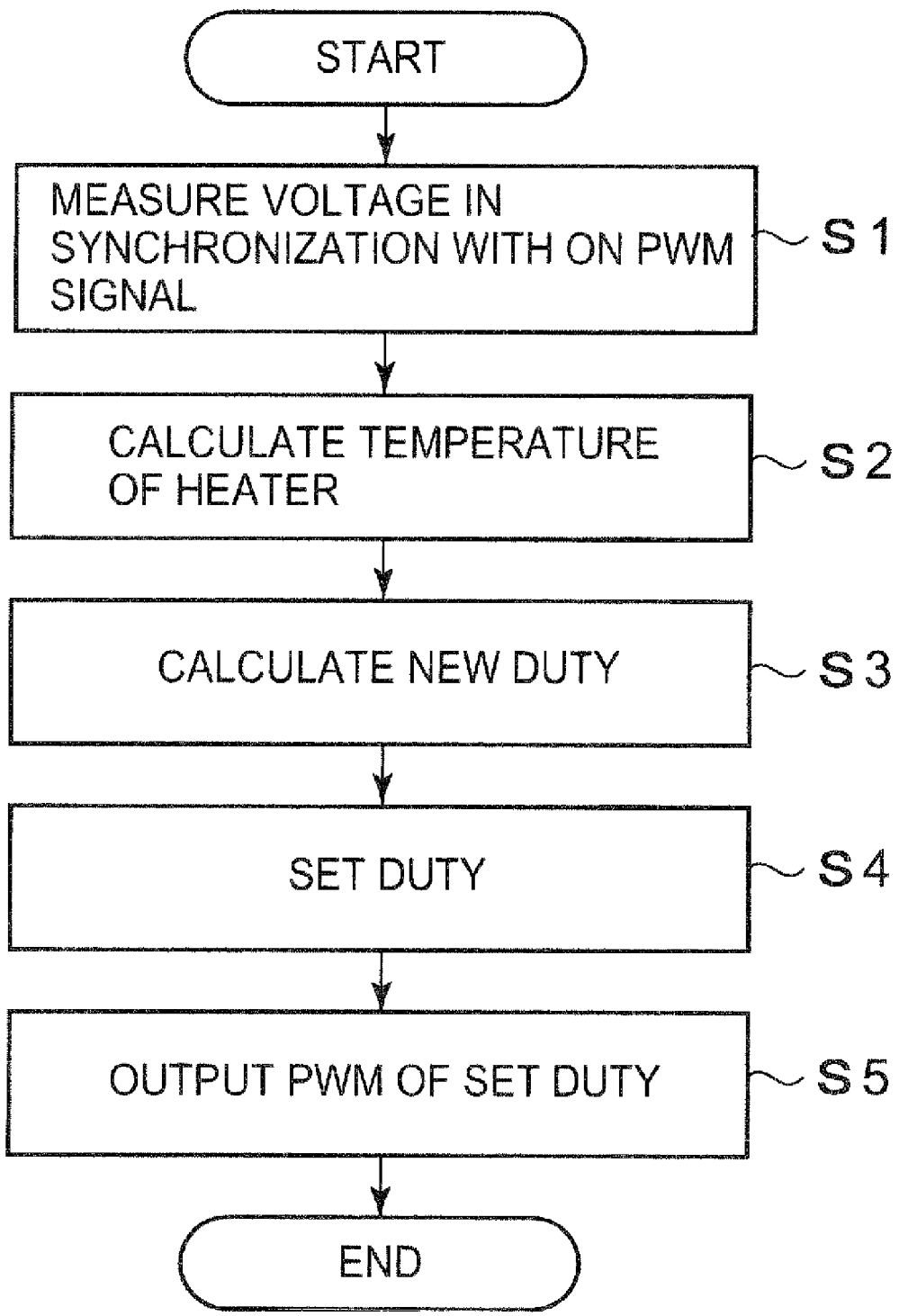
FIG. 3 is a flow chart showing a process flow in the temperature control apparatus according to the first embodiment.

FIG. 3 is a flow chart showing a process flow in the temperature control apparatus according to the embodiment.

The processes in the flow chart shown in FIG. 3 are performed during one period of the PWM signal or during the integral multiple of the period.

Firstly, the PWM controller 51 sets an initial duty ratio to output the PWM signal of the set initial duty. When the PWM signal is in on voltage, the PWM switch SW1 becomes the on status and the current flows through the resistance heater 11. On the other hand, when the PWM signal is in off voltage, the PWM switch SW1 becomes the off status and the current does not flow through the resistance heater 11.

Then, the voltage across the fixed resistance R8 is measured by the differential amplifier 55, and the digital signal representing the voltage across the fixed resistance R8 is output from the ADC 56 to the PWM controller 51. The PWM controller 51 reads the voltage across the resistance heater 11 in synchronization with the on voltage of the PWM signal (Step S1).

After that, the PWM controller 51 calculates the resistance value and the temperature of the resistance heater 11 based on the voltage across the fixed resistance R8 measured by the differential amplifier 55 (Step S2).

Specifically, the resistance value is presented by the formula of (the resistance value of the resistance heater 11)={(the constant voltage $V_s$)−(the voltage across the fixed resistance R8)}×(the resistance value of the fixed resistance R8)/(the voltage across the fixed resistance), and this formula is previously set in the PWM controller 51 so that the PWM controller 51 calculates the resistance value of the resistance heater 11 using the formula.

Moreover, the value of the constant voltage $V_s$ and the resistance value of the fixed resistance R8 are previously set in the PWM controller 51 so that the PWM controller 51 obtains the resistance value of the resistance heater 11.

Furthermore, the formula or the data table for obtaining the temperature of the resistance heater 11 based on the resistance value of the resistance heater 11 or the voltage across the fixed resistance R8 is previously set in the PWM controller 51, and the PWM controller 51 calculates the temperature of the resistance heater 11 based on the resistance value of the resistance heater 11 or the voltage across the fixed resistance R8 with reference to the formula or the data table.

Incidentally, if voltage drop of the PWM switch SW1 is not ignored, the resistance value is presented by the formula of (the resistance value of the resistance heater 11)={(the constant voltage $V_s$)−(the voltage across the fixed resistance R8)−(the voltage across the PWM switch SW1 in the on status)}×(the resistance value of the fixed resistance R8)/(the voltage across the fixed resistance R8).

Then, the PWM controller 51 calculates the new duty ratio based on the obtained temperature of the resistance heater 11 (Step S3). As that time, the PWM controller 51 calculates the new duty ratio by the PID method, for example.

Specifically, if a deviation of a temperature $TR\_n$ of the resistance heater 11 obtained at the $n^{th}$ control from start of control and the set temperature (optimum temperature) $T_{set}$ is denoted by $e_n = TR\_n − T_{set}$, then the new duty ratio A for bringing the temperature of the resistance heater 11 close to the set temperature (optimum temperature) $T_{set}$ can be set by a general relational formula of $A = P\{e_n + I\Sigma e_n + D(e_n − e_{n−1})\}$ by using a proportional weighting coefficient P, an integration weighting coefficient I, and a differentiation weighting coefficient D, which are determined in advance.

Thus, the PWM controller 51 calculates the new duty ratio for bringing the temperature of the resistance heater 11 close to the set temperature $T_{set}$ in accordance with the obtained temperature (resistance value) of the resistance heater 11 (Step S3).

After that, the PWM controller 51 sets the duty ratio of the PWM signal to be output to newly obtained duty ratio (Step S4).

Then, the PWM controller outputs the PWM signal the duty ratio of which is set to newly obtained duty ratio to the PWM switch SW1 (Step S5).

After that, the above-described processes shown in FIG. 3 are performed repeatedly This brings the temperature of the resistance heater 11 close to the set temperature and maintains the set temperature.

As described above, according to the embodiment, since the PWM control method is used for the temperature control to set the temperature of the resistance heater 11 to the optimum temperature and to maintain it, it becomes possible to reduce the power consumption at portions other than the resistance heater 11 so as to reduce the heat generation at portions other than the resistance heater 11.

In other words, since the PWM control method is used, it is possible to allow the resistance value of the fixed resistance R8 to be fully small As a result, when the PWM signal is in on voltage, it is possible to reduce the power consumption in the fixed resistance R8 or the PWM switch SW1 so that most electric power is consumed in the resistance heater 11.

Moreover, in order to calculate the resistance value and the temperature of the resistance heater 11, the voltage across the fixed resistance R8 connected to the resistance heater 11 in series is measured. If the resistance value of the fixed resistance R8 is small, a response voltage across the fixed resistance R8 is also small so that the power consumption in the fixed resistance R8 is also small. Therefore, measuring the voltage across the fixed resistance R8 is more precise than measuring the current flowing through the resistance heater 11 or the voltage across the resistance heater 11. Therefore, more accurate temperature control can be performed.

[Second Embodiment]

Next, the second embodiment of the temperature control apparatus according to the present invention will be described specifically.

Figure 4:
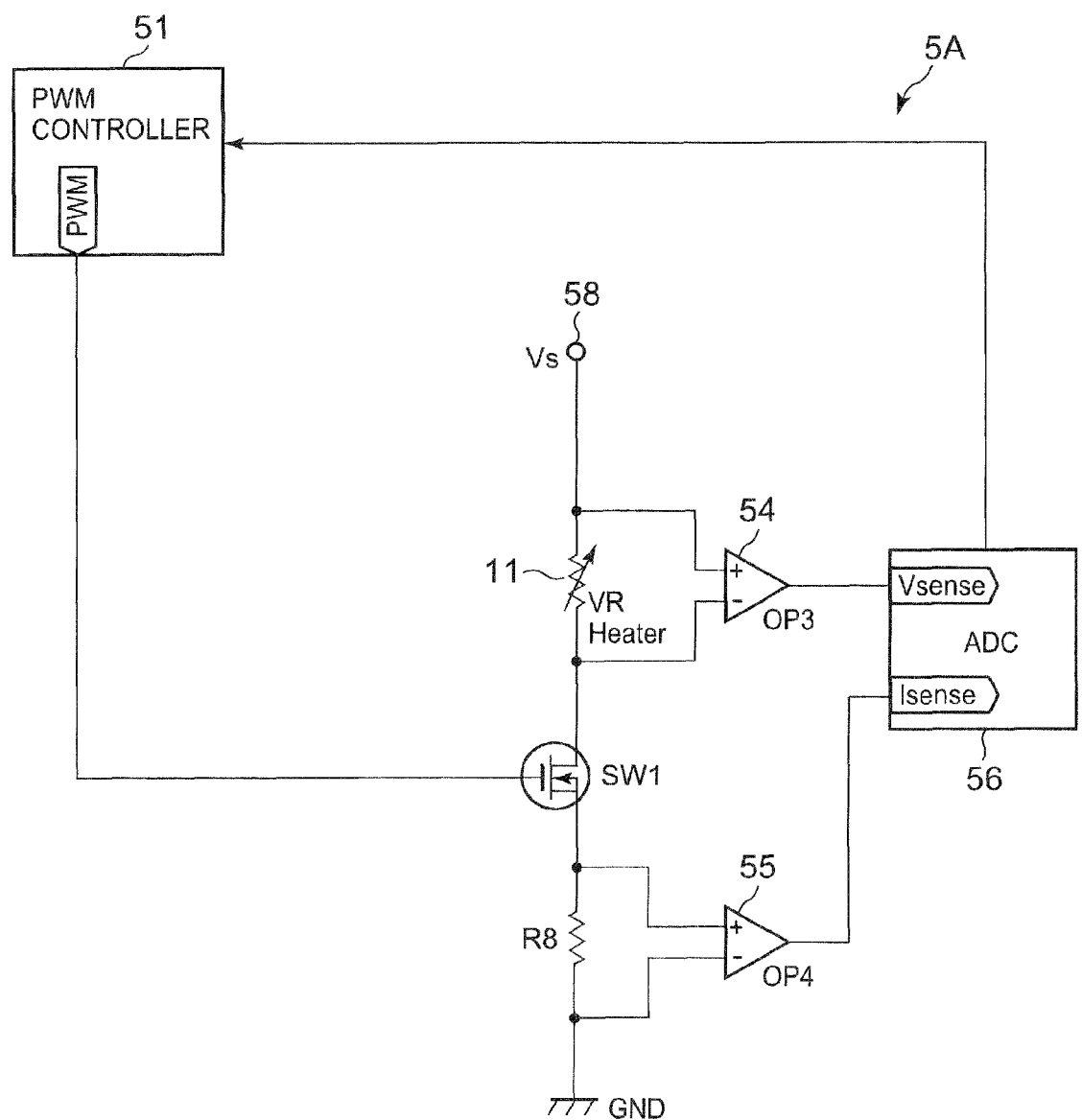
FIG. 4 is a circuit drawing showing a circuit configuration of the temperature control apparatus according to the second embodiment of the present invention.

FIG. 4 is a circuit drawing showing a circuit configuration of the temperature control apparatus according to the second embodiment of the present invention;

As shown in FIG. 4, a temperature control apparatus 5A according to this embodiment includes a differential amplifier 54 in addition to the configuration of the temperature control apparatus 5 shown in FIG. 2.

The differential amplifier 54 outputs a signal representing a difference between the constant voltage $V_s$ and a voltage across a connecting node of the resistance heater 11 and the PWM switch SW1, namely a voltage across the resistance heater 11, to the ADC 56. Since the differential amplifier 54 is a well-known circuit, the illustration of the components of the differential amplifier 54 such as a feedback resistance other than the operational amplifier OP3 is omitted.

The ADC 56 converts a signal input from the differential amplifier 54 from analog to digital, and outputs a digital signal representing the voltage across the resistance heater 11 to the PWM controller 51. The ADC 56 also converts a signal input from the differential amplifier 55 from analog to digital, as might be expected.

The voltage measured by the differential amplifier 54 is the voltage across the resistance heater 11. As described in the first embodiment, the current flowing through the resistance heater 11 is unambiguously obtained from the voltage measured by the differential amplifier 55. Therefore, the resistance value and the temperature of the resistance heater 11 are unambiguously obtained based on the voltage measured by the differential amplifiers 54, 55.

Specifically, the resistance value is presented by the formula of (the resistance value of the resistance heater 11)=(the voltage across the resistance heater 11)×(the resistance value of the fixed resistance R8)/(the voltage across the fixed resistance R8).

Also in the temperature control apparatus 5A according to the second embodiment, the PWM controller 51 calculates the resistance value and the temperature of the resistance heater 11 based on the voltage measured by the differential amplifiers 54, 55 in order to bring the temperature of the resistance heater 11 close to the set temperature and maintaining the set temperature (Step S2 in FIG. 3).

In this case, when the calculation is performed, the voltage measured by the differential amplifiers 54, 55 at the time when the PWM signal is in on voltage is used (Step S1, Step S2).

Then, the PWM controller 51 calculates the new duty ratio based on the obtained temperature of the resistance heater 11 to set the new duty ratio (Step S3, Step S4), and outputs the PWM signal of the newly obtained duty ratio to the PWM switch SW1 (Step S5). Such processes by the PWM controller 51 are repeated.

[Third Embodiment]

Next, the third embodiment of the temperature control apparatus according to the present invention will be described specifically.

Figure 5:
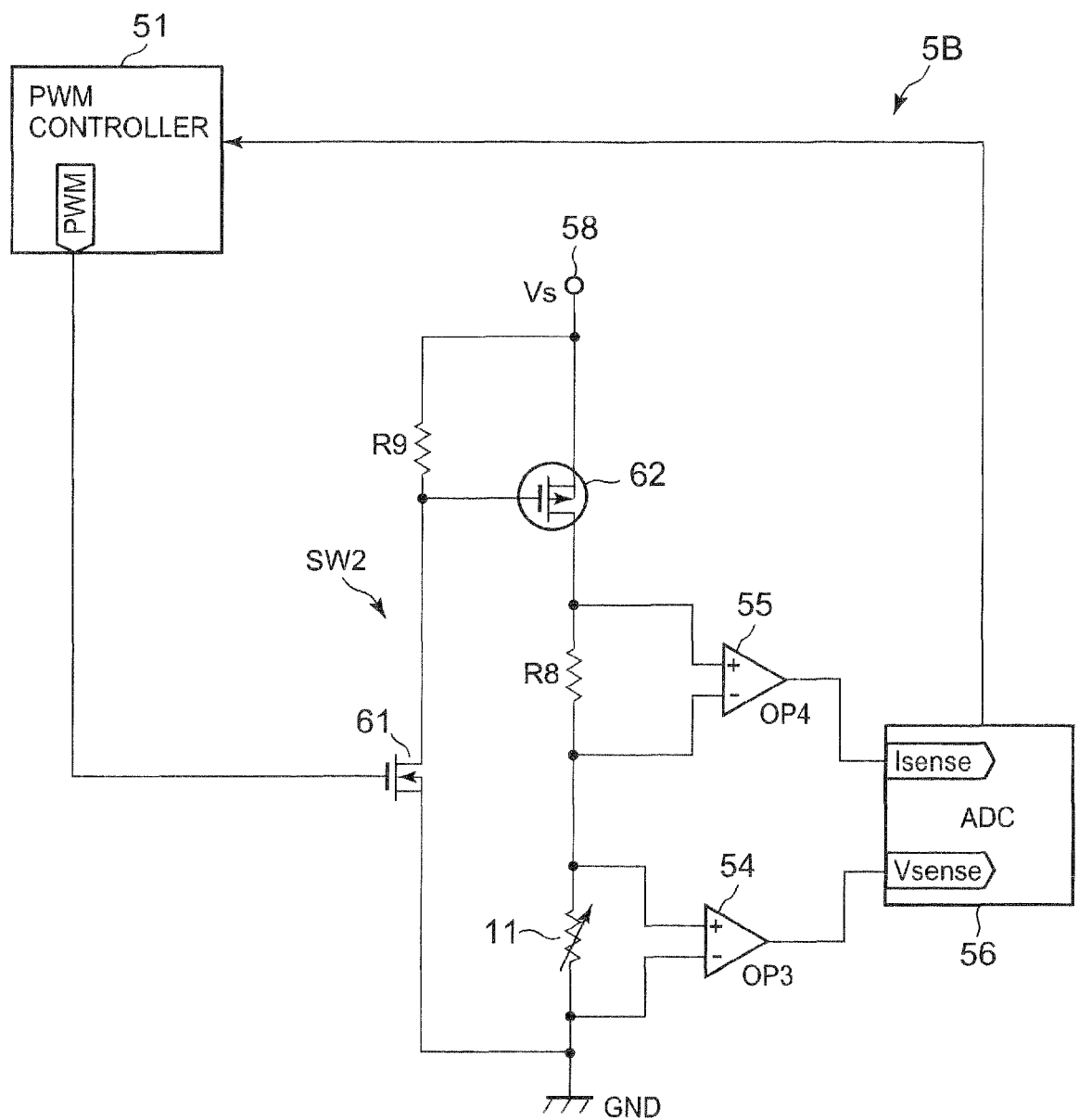
FIG. 5 is a circuit drawing showing a circuit configuration of the temperature control apparatus according to the third embodiment of the present invention.

FIG. 5 is a circuit drawing showing a circuit configuration of the temperature control apparatus according to the third embodiment of the present invention.

As shown in FIG. 5, in a temperature control apparatus 5B according to this embodiment, a PWM switch SW2 corresponding to a switching section includes an enhancement type n-channel MOSFET 61, an enhancement type p-channel MOSFET 62, and a resistance R9.

The MOSFET 62, the fixed resistance R8 and the resistance heater 11 are connected to one another in series between the power source input terminal 58 and the ground.

Specifically, the resistance heater 11 is connected between the fixed resistance R8 and the ground, the fixed resistance R8 is connected between a drain electrode of the MOSFET 62 and the fixed resistance R8, and a source electrode of the MOSFET 62 is connected to the power source input terminal 58. Moreover, a source electrode of the MOSFET 61 is connected to the ground, a drain electrode of the MOSFET 61 is connected to a gate electrode of the MOSFET 62, and the resistance R9 is connected between a connecting node of the MOSFETS 61, 62 and the power source input terminal 58.

The differential amplifier 54 outputs a signal representing the voltage across the resistance heater 11 to the ADC 56. The differential amplifier 55 outputs a signal representing the voltage across the fixed resistance R8 to the ADC 56.

The ADC 56 converts a signal input from the differential amplifier 54 from analog to digital, and outputs a digital signal representing the voltage across the resistance heater 11 to the PWM controller 51. The ADC 56 also converts a signal input from the differential amplifier 55 from analog to digital, and outputs a digital signal to the PWM controller 51.

In the temperature control apparatus 5B according to the embodiment, the PWM controller 51 outputs the PWM signal to a gate electrode of the MOSFET 61. When the PWM signal is in on voltage, both of the MOSFETS 61, 62 become it's on status so that a current flows through the resistance heater 11. When the PWM signal is in off voltage, both of the MOSFETS 61, 62 become their off status so that a current does not flow through the resistance heater 11.

Moreover, in order to bring the temperature of the resistance heater 11 close to the set temperature and to maintain the set temperature, the PWM controller 51 calculates the resistance value and the temperature of the resistance heater 11 based on the voltage measured by the differential amplifiers 54, 55 (Step S2 in FIG. 3). In this case, when the calculation is performed, the voltage measured by the differential amplifiers 54, 55 at the time when the PWM signal is in on voltage is used (Step S1, Step S2).

Then, the PWM controller 51 calculates the new duty ratio based on the obtained temperature of the resistance heater 11 to set the new duty ratio (Step S3, Step S4), and outputs the PWM signal of the newly obtained duty ratio to the PWM switch SW1 (Step S5). Such processes by the PWM controller 51 are repeated.

Incidentally, in Step S2, the PWM controller 51 can calculate the resistance value and the temperature of the resistance heater 11 based on the voltage measured by the differential amplifier 55. The calculation is same as that of the first embodiment.

Next, advantages of the configuration according to the present invention will be described in comparison with a configuration of a conventional temperature control apparatus.

COMPARISON EXAMPLE

Figure 6:
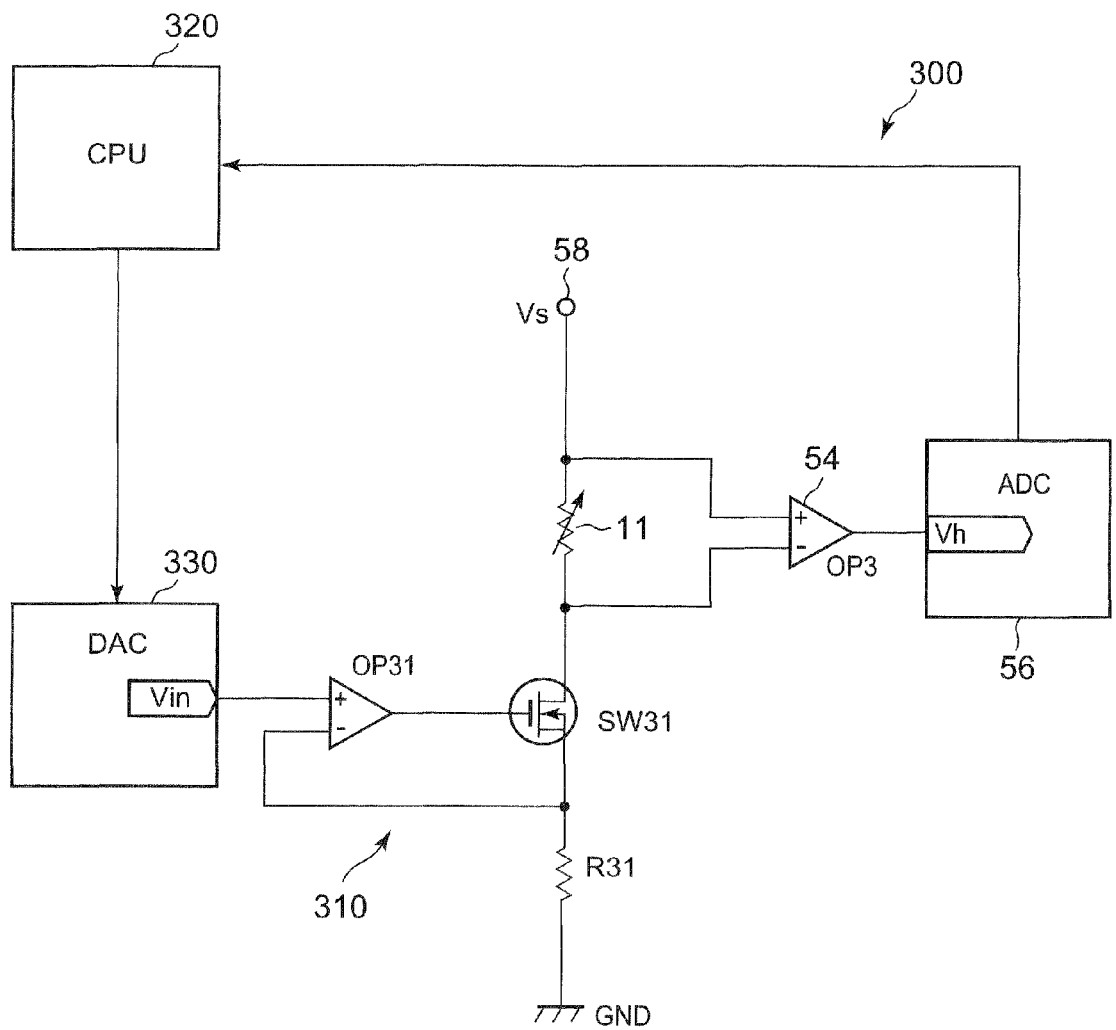
FIG. 6 is a circuit drawing showing a circuit configuration of a conventional temperature control apparatus as a comparative example.

FIG. 6 is a circuit drawing showing a circuit configuration of a conventional temperature control apparatus as a comparative example.

The resistance heater 11, the differential amplifier 54, and the ADC 56 of the temperature control apparatus 300 are same as those of the temperature control apparatus 5A shown in FIG. 4. In the temperature control apparatus 300, a constant current circuit 310 is composed of a switching element SW31, an operational amplifier OP31, and the resistance R31.

When a CPU 320 outputs a digital signal to a digital to analog converter (hereinafter, briefly referred to a DAC) 330, the digital signal is converted to an analog signal by the DAC 330, and the voltage of the level according to the digital signal is input into the noninverting input terminal of the operational amplifier OP31 so that the constant current of the magnitude according to the voltage level flows through the resistance heater 11. The CPU 320 thereby adjusts the magnitude of the current flowing through the resistance heater 11.

The voltage across the resistance heater 11 at the time when the constant current flows is then measured by the differential amplifier 54 and the ADC 56 to be fed back to the CPU 320. The CPU 320 calculates the resistance value, the temperature, and the electric power of the resistance heater 11 based on the measured voltage across the resistance heater 11, and adjusts the magnitude of the current flowing through the resistance heater 11 based on the obtained resistance value, the temperature, and the electric power.

With regards to the temperature control apparatus 300 shown in FIG. 6, one example of a circuit design will be described with specific numeric values. It is assumed that the temperature control apparatus 5 shown in FIG. 1 is replaced by the temperature control apparatus 300, and the resistance heater 11 where the resistance value thereof is 250Ω at the time when the temperature of the resistance heater 11 is 280° C. is used.

In an initial status, if the constant current of 120 [mA] flows through the resistance heater 11 at the time of startup, when the temperature reaches to 280 [° C.], the resistance value of the resistance heater 11 is 250 [Ω], the voltage across the resistance heater 11 is 30 [V] and the electric power of the resistance heater 11 is 3.6 [W]. The maximum input of the operational amplifier OP3 is the voltage at that time, and if the ADC 56 of 8 bits and the CPU 320 process the voltage output from the operational amplifier OP3, resolution capability becomes 30/256=117 [mV/digit]. If the resolution capability is considered from the point of view of the temperature, then it becomes 280/256=1.09 [° C./digit]. Thus, suitable accuracy to the catalyst reactions, which require the temperature management by the 1° C., is obtained.

From such a state, heat propagates to the whole reaction apparatus body 3. If the heat loss of the reformer 7 at the time when the reaction apparatus body 3 becomes in a thermal equilibrium state is supposed to 1.5 [W], the electric power of the resistance heater 11 equally becomes 1.5 [W]. At this time, the temperature of the reformer 7 is constant to be 280 [° C.], and the resistance value of the resistance heater 11 is also constant to be 250 [Ω]. Consequently, it is concluded that the temperature control is performed on the supposition that the voltage across the resistance heater 11 is 19.4 [V] and the current flowing through the resistance heater 11 is 77.5 [mA].

From such a thermal equilibrium state, the supplies of a fuel and water are performed. When a reforming reaction is started in the reformer 7 and burning is produced in the combustor 9 (working state), if the supplied heat quantity by the resistance heater 11, which is necessary for keeping the reformer 7 at 280 [° C.], is supposed to be 0.4 [W], then the voltage across the resistance heater 11 at this time is 10 [V] and the current flowing through the resistance heater 11 is 40 [mA]. Incidentally, because the gain of the operational amplifier OP3 also in this state is the same as the one on startup, the voltage across the resistance heater 11 is measured only as 10 [V]/117 [mV]=85 [digit] in the ADC 56. If it is considered from the point of view of a temperature, the resolution capability becomes 280 [° C.]/85 [digit]=3.29 [° C./digit], and it is found that the suitable accuracy is not obtained as the temperature to be used for feedback control.

EXAMPLE

With regards to the temperature control apparatus 5 shown in FIG. 2, one example of a circuit design will be described with specific numeric values.

Firstly, the frequency of the PWM signal is determined in view of the measured velocity of the operational amplifier OP4 under the following two conditions.

The first condition is an upper limit condition such that the frequency of the PWM signal is a frequency capable of stabilizing the current flowing through the resistance heater 11 when the PWM signal is in on voltage.

The second condition is a lower limit condition that the frequency of the PWM signal is a faster frequency than the follow-up speed of the temperature of the reformer 7, which is in the order of milliseconds.

Now, if it is supposed that the measurement of the operational amplifier OP4 needs the time of 20 [μs], and if a surplus time of 10 [μs] for switching the duty of the PWM signal and for the stabilization of the current flowing through the resistance heater 11 is supposed, then the time during the PWM signal's on voltage is led to be needed to be 30 [μs] or more.

However, the control at very low duty ratio is expected in the working state in which the reforming reaction is started in the reformer 7 and the combustion occurs in the combustor 9, and the frequency of the PWM signal is desired to be the one that is distant from the lower limit condition as much as possible to be a speed near to the upper limit condition in order to secure the temperature controllability.

If the minimum requisite time 30 [μs] is set to the duty equivalent to 1% with the aim of securing the resolution capability of control to a maximum extent, then the period of the PWM signal becomes slow to the millisecond order like 3 [ms] (330 [Hz]), and there is the possibility that the temperature is disturbed by following a control period.

On the other hand, if the minimum requisite time is made to be conversely set to be equivalent to a duty ratio higher than 10%, the maximum of the duty in off voltage becomes less than 90%, and there is possibility that the power consumption by the resistance heater 11 becomes excess in the working state where the reforming reaction occurs in the reformer 7. In consideration of these factors, the minimum requisite time necessary for voltage measurement 30 [μs] is set to be equivalent to the duty of 5 [%] here, and the PWM signal is set to be performed at the duty within a range from 5 [%] to 100 [%].

At this time, the period of the PWM signal becomes 600 [μs] (1.6 [kHz]). Moreover, the resistance value of the fixed resistance R8 used for the voltage measurement is set to small value, for example, 0.1 [Ω], in order to keep down the voltage to be measured. Then, in order to keep down the resistance of the PWM switch SW1, which is MOSFET, at the time of it's on status, it is assumed that TPCA8016-H (produced by TOSHIBA Co.) of 16 [mΩ] is used as the resistance.

Incidentally, as a frequency range of the PWM signal which is applicable here, an example of the case that the IC of LT1296 (produced by LINEAR TECHNOLOGY Co.) is selected as the ADC 56 is given.

The operation clock frequency of the IC is 1 [MHz] at the fastest speed, the sampling time at that time is 2.5 [clock]≈2.5 [μs], the time to completion of converting is 22 [clock]≈22 [μs]. If the sampling time is set to be equivalent to the duty of 10 [%] and the current at the time when the PWM signal is in on voltage stays in the order of nanoseconds (waiting time is unnecessary), the frequency of the epicenter of the PWM is 25 [μs]=40 [kHz]. It is longer time than conversion completion time 22 [μs], and the frequency without problem even if AD conversion is performed repeatedly.

On the other hand, if temperature controls are performed at 100 [ms] intervals, it is preferred to perform measuring at least five times between the intervals so as to be able to obtain the measurement value as an average of three values with a maximum value and a minimum value are removed. At that time, the frequency of the PWM signal is 100 [ms]/5=20 [ms]=50 [Hz], and the time of the duty equivalent to 1 [%] is 200 [μs]. Therefore, in this case, the time of 1 [%] is sufficient to be provided to the AD conversion.

However, it is preferred to review this frequency only when it can be confirmed that a temperature response speed is sufficiently later than 20 [ms] for preventing the temperature from changing according to the period of the control. As described above, when LT1296 (produced by LINEAR TECHNOLOGY Co.) is used as the ADC 56, the upper limit of the PWM signal is obtained as 40 [kHz], and the lower limit of the PWM signal is obtained as 50 [Hz].

According to the design where the frequency of the PWM signal is 1.6 [kHz], in the initial status of startup, if the duty of the PWM signal is 90 [%], the current at the time of on voltage corresponding to the resistance value (250 [Ω]) of the resistance heater 11 at 280 [° C.] is 126 [mA], and the voltage is 31.5 [V]. The voltage at that time is the maximum voltage on the control, and here the value of the constant voltage $V_s$ is set at 32 [V] for obtaining a margin of 0.5 [V]. In this case, the current is 128 [mA].

In the case that the reformer 7 becomes in a thermal equilibrium state, the duty for keep the value of the constant voltage $V_s$ at 32 [V] and for allowing the electrical power of the resistance heater 11 at the time of on voltage to be 1.5 [w] is 36 [%]. In the working state where the reforming reaction occurs in the reformer 7, the duty for allowing the electrical power of the resistance heater 11 at the time of on voltage to be 0.4 [w] is 10 [%]. Here, even in the working state, it can be confirmed that a margin for the PWM signal is obtained to the extent of 5 [%] of a resolution capability.

Moreover, the maximum input of the operational amplifier OP4 is reduced to 12.8 [mV] (0.1 [Ω]×128 [mA]) if the current flowing through the resistance heater 11 is 128 [mA], and if it is processed by the ADC 56 of 8 bit, the resolution capability considered from the point of view of the temperature is (as might be expected because the temperature and the bit number are same as those of the comparison example) 280 [° C.]/256=1.09 [° C./digit], which is same as the value obtained in the initial status in the comparison example. However, it is advantageous to be able to perform measuring at this resolution capability under all conditions of the temperature control apparatus 5 designed here (The electrical resolution capability is 12.8 [mV]/256=50 [μV/digit]).

In an actual measurement, in the condition where the temperature of the resistance heater 11 is 280 [° C.] (the resistance value corresponding thereto is 250 [Ω]), not depending on the duty, only the voltage across the fixed resistance R8 at the time of on voltage which is 0.1 [Ω]×128 [mA]=12.8 [mV] is measured to firstly obtain the current (128 [mV]) of the resistance heater 11 at the time of the on voltage by calculating back with the voltage.

The sum of the voltage across the fixed resistance R8 and the voltage across the PWM switch PW1 is 14.8 [mV], the voltage across the resistance heater 11 is calculated to be 32 [V]−14.8 [mV]=31.99 [V]. From these values, the resistance value of the resistance heater 11 is calculated to 249.9 [Ω] with high accuracy.

Next, the resistance value applicable to the fixed resistance R8 will be explained.

Firstly, the maximum value of the fixed resistance R8 is the value in the case that the voltage to be measured becomes equal to the input upper limit voltage $V_{ref}$ of the operational amplifier for voltage measurement, under the condition that the voltage value of the constant voltage $V_s$ is constant and the resistance value of the resistance heater 11 is the minimum value $R_{min}$, when the maximum current $I_{max}$ flows through the resistance heater 11 at the time when the PWM signal is in on voltage.

In the case of the example, since the temperature coefficient of the resistance heater 11 is positive, the resistance value becomes minimum $R_{min}$ in the condition of room temperature at the time of startup, which is 160 [Ω]. Then, if Vs=32 [V] and $V_{ref}$=5 [V], the value of the maximum current $I_{max}$ is determined such that $I_{max}$=168.8 [mA] from the relations that Vs=($R_{min}$+R8)×$I_{max}$, R8×$I_{max}$=$V_{ref}$, and the maximum value of the R8 is calculated to be 29.6 [Ω]. In this case, an accuracy of voltage measurement can be maximized by using the value of $V_{ref}$ to a maximum extent. If an input reference voltage across the ADC 56 is equal to $V_{ref}$ of the amplifier considered here, it is also possible to directly measure an induced voltage by the ADC 56 while omitting an amplifier for voltage measurement. However, an efficiency is down because the electric power of R8×$I_{max}^2$=845 [mW] is consumed on the system side, and since only the voltage of $V_s$−$V_{ref}$ can be applied to the resistance heater 11, it becomes necessary to reset $V_s$ according to the power consumption necessary for the resistance heater 11.

Next, the minimum value of the fixed resistance R8 is the value that fulfills the condition such that R8×$\Delta I_h$≧$V_{op}$ when the resistance value of the resistance heater 11 at a rated operation temperature (280° C. in the example) is $R_h$, the current flowing through the resistance heater 11 at the time when the PWM signal is in on voltage is $I_h$, an amount of resistance change of the resistance heater 11 corresponding to temperature accuracy of 1° C. necessary for catalytic reaction control within the temperature range is $\Delta R_h$ (0.3Ω in the example), a current change corresponding to the amount of resistance change is $\Delta I_h$, and the resolution capability of the input voltage of the operational amplifier for voltage measurement is $V_{op}$. Here, based on the relation that $V_s$=$R_h$×$I_h$ because $R_h$≫R8, $V_s$ becomes such that $V_s$=($R_h$+$\Delta R_h$)×($I_h$−$\Delta I_h$) so that $\Delta I_h$=$I_h$−($V_s$/($R_h$+$\Delta R_h$)). For example, if a high accuracy instrumentation amplifier (produced by LINEAR TECHNOLOGY Co., etc.) is used as the operational amplifier for voltage measurement, $V_{op}$=about 10 [μV] so that the minimum value of R8 is 0.065 [Ω] in the case of the example. In this case, the power consumption on the system side can be minimized by taking advantage of the capability of the operational amplifier for voltage measurement. Since it is actually necessary to consider the cost of the fixed resistance or the amplifier, the above-mentioned example explains the case where the value of R8 is 0.1 [Ω].

The above description shows that, by the parameters of the designs here, the control by the comparison example can be replaced with the combination of the PWM control and the calculation of the resistance value with the current measurement value which are given in the examples.

By the replacement of the control method in the example, the power consumption as heat on the control circuit side is reduced so that energy efficiency is improved, and cooling measures become unnecessary so that miniaturization of circuits is achieved.

Moreover, the response voltage across the reference resistance is kept low, and by amplifying the response voltage with high gain, the measured voltage itself and the temperature accuracy obtained therefrom is improved.

All of the disclosures including the patent specification, the claims, the attached drawings and the abstract of Japanese Patent Application No. 2007-255100 filed on Sep. 28, 2007 are herein incorporated by reference.

Although various typical embodiments have been shown and described, the present invention is not limited to those embodiments. Consequently, the scope of the present invention can be limited only by the following claims.

What is claimed is:

1. An temperature control apparatus comprising:
a resistance heater having characteristics that a resistance value of the resistance heater changes dependently on a temperature thereof;
a fixed resistance connected to the resistance heater in series;
a signal generator to output a control signal which has two voltage levels of a first voltage and a second voltage;
a switching section to flow a current through the resistance heater and the fixed resistance when the voltage level of the control signal is the first voltage, and not to flow a current through the resistance heater and the fixed resistance when the voltage level of the control signal is the second voltage; and a first voltage measuring instrument to measure a voltage value across the fixed resistance at the time when the current flows through the fixed resistance,
wherein the signal generator controls the temperature of the resistance heater based on the measured voltage by the first voltage measuring instrument.

2. The temperature control apparatus according to claim 1, wherein the fixed resistance has a smaller resistance value than the resistance value of the resistance heater.

3. The temperature control apparatus according to claim 2, wherein the resistance value of the fixed resistance is in a range from 0.06Ω to 30 Ω.

4. The temperature control apparatus according to claim 1, wherein:
the control signal is a pulse signal of certain period which has the two voltage levels of the first voltage and the second voltage; and
the signal generator is a PWM controller which controls a value of a duty ratio which is a ratio between a time when the control signal is in the voltage level of the first voltage and a time when the control signal is in the voltage level of the second voltage.

5. The temperature control apparatus according to claim 4, wherein the PWM controller obtains the temperature of the resistance heater based on the measured voltage by the first voltage measuring instrument at the time when the control signal output from the PWM controller is in the first voltage, and resets the duty ratio of the control signal to bring the temperature of the resistance heater close to a predetermined set temperature.

6. The temperature control apparatus according to claim 4, wherein the resistance heater and the fixed resistance are connected to each other in series, and a constant voltage is applied between terminals of the resistance heater and the fixed resistance through the switching section.

7. The temperature control apparatus according to claim 6, wherein the PWM controller calculates the resistance value of the resistance heater by a formula of (the resistance value of the resistance heater)={(the voltage value of the constant voltage)−(the measured voltage by the first voltage measuring instrument)}×(the resistance value of the fixed resistance)/(the measured voltage by the first voltage measuring instrument) to obtain the temperature of the resistance heater from the obtained resistance value based on resistance-temperature variation characteristics of the resistance heater, and changes the duty ratio of the control signal based on a difference between the obtained temperature of the resistance heater and a predetermined set temperature.

8. The temperature control apparatus according to claim 6 further comprising a second voltage measuring instrument to measure a voltage value across the resistance heater at the time when the current flows through the resistance heater,
wherein the PWM controller calculates the resistance value of the resistance heater by a formula of (the resistance value of the resistance heater)=(the measured voltage by the second voltage measuring instrument)×(the resistance value of the fixed resistance)/(the measured voltage by the first voltage measuring instrument) to obtain the temperature of the resistance heater from the obtained resistance value based on resistance-temperature variation characteristics of the resistance heater, and changes the duty ratio of the control signal based on a difference between the obtained temperature of the resistance heater and a predetermined set temperature.

9. The temperature control apparatus according to claim 6, wherein the switching section is composed of a switching element connected to the resistance heater and the fixed resistance in series, the switching section includes a control terminal to which the control signal is applied, and the switching section is in on status when the control signal is in the first voltage and in off status when the control signal is in the second voltage.

10. The temperature control apparatus according to claim 6, wherein the switching section includes:
a first switching element in which the constant voltage is applied to one terminal of a current path of the first switching element through a predetermined resistance element and the other terminal of the current path is connected to a ground voltage, the first switching section including a control terminal to which the control signal is applied, and the first switching element being in on status when the control signal is in the first voltage and in off status when the control signal is in the second voltage; and
a second switching element connected to the resistance heater and the fixed resistance in series, in which a control terminal thereof connected to a connecting node of the current path of the first switching element and the resistance element, and the second switching element being in on status when the control signal is in the first voltage and in off status when the control signal is in the second voltage.

11. A processing apparatus, supplied a raw material, subjected to temperature control thereof, causing a reaction or a phase change of the raw material, the apparatus comprising:
a processing device to cause the reaction or the phase change of the raw material; and
a temperature control apparatus including:
a resistance heater provided in the processing device to heat the processing device, the resistance heater having characteristics such that a resistance value of the resistance heater changes dependently on a temperature thereof;
a fixed resistance connected to the resistance heater in series;
a signal generator to output a control signal which has two voltage levels of a first voltage and a second voltage;
a switching section to flow a current through the resistance heater and the fixed resistance when the voltage level of the control signal is the first voltage, and not to flow a current through the resistance heater and the fixed resistance when the voltage level of the control signal is the second voltage; and
a first voltage measuring instrument to measure a voltage value across the fixed resistance at the time when the current flows through the fixed resistance,
wherein the signal generator controls the temperature of the resistance heater based on the measured voltage by the first voltage measuring instrument.

12. The processing apparatus according to claim 11, wherein the fixed resistance has a smaller resistance value than the resistance value of the resistance heater.

13. The processing apparatus according to claim 11, wherein:
the raw material is a liquid;
the processing device is a vaporizer to heat the raw material to vaporize it; and
the temperature control apparatus controls the temperature of the resistance heater to bring the temperature to close to a suitable temperature for vaporizing the raw material.

14. The processing apparatus according to claim 11, wherein:

the raw material is a mixture gas produce by vaporizing water and a liquid fuel including hydrogen in its composition;

the processing device is a reformer to produce a gas including the hydrogen by causing a reforming reaction of the raw material; and the temperature control apparatus controls the temperature of the resistance heater to bring the temperature to close to a suitable temperature for causing the reforming reaction.

15. The processing apparatus according to claim 11, wherein:

the control signal in the temperature control apparatus is a pulse signal of certain period which has the two voltage levels of the first voltage and the second voltage; and the signal generator is a PWM controller which controls a value of a duty ratio which is a ratio between a time when the control signal is in the voltage level of the first voltage and a time when the control signal is in the voltage level of the second voltage.

16. The processing apparatus according to claim 15, wherein the PWM controller in the temperature control apparatus obtains the temperature of the resistance heater based on the measured voltage by the first voltage measuring instrument at the time when the control signal output from the PWM controller is in the first voltage, obtains the temperature of the resistance heater based on resistance-temperature variation characteristics of the resistance heater, and resets the duty ratio of the control signal to bring the temperature of the resistance heater close to a predetermined set temperature.

17. The processing apparatus according to claim 15, wherein the resistance heater in the temperature control apparatus and the fixed resistance are connected to each other in series, and a constant voltage is applied between terminals of the resistance heater and the fixed resistance through the switching section.

18. The processing apparatus according to claim 17, wherein the switching section in the temperature control apparatus is composed of a switching element connected to the resistance heater and the fixed resistance in series, the switching section includes a control terminal to which the control signal is applied, and the switching section is in on status when the control signal is in the first voltage and in off status when the control signal is in the second voltage.

19. The processing apparatus according to claim 17, wherein the switching section in the temperature control apparatus includes:

a first switching element in which the constant voltage is applied to one terminal of a current path of the first switching element through a predetermined resistance element and the other terminal of the current path is connected to a ground voltage, the first switching section including a control terminal to which the control signal is applied, and the first switching element being in on status when the control signal is in the first voltage and in off status when the control signal is in the second voltage; and a second switching element connected to the resistance heater and the fixed resistance in series, the second switching element including a control terminal connected to a connecting node of the current path of the first switching element and the resistance element, and the second switching element being in on status when the control signal is in the first voltage and in off status when the control signal is in the second voltage.

20. A temperature control method for controlling a temperature of the resistance heater having characteristics that a resistance value of the resistance heater changes dependently on a temperature thereof, the temperature control method comprising:

outputting a control signal which has two voltage levels of a first voltage and a second voltage;

flowing a current through the resistance heater and the fixed resistance connected to the resistance heater in series when the voltage level of the control signal is the first voltage and shutting off a current flowing through the resistance heater and the fixed resistance when the voltage level of the control signal is the second voltage;

measuring a voltage value across the fixed resistance at the time when the control signal is in the first voltage; and controlling the control signal based on the voltage value measured by the measuring step to control the temperature of the resistance heater.

21. The temperature control method according to claim 20, wherein:

the control signal is a pulse signal of certain period which has the two voltage levels of the first voltage and the second voltage; and the controlling step includes controlling a value of a duty ratio which is a ratio between a time when the control signal is in the voltage level of the first voltage and a time when the control signal is in the voltage level of the second voltage.

22. The temperature control method according to claim 21, wherein the controlling step includes:

calculating the resistance value of the resistance heater based on the voltage value measured by the measuring step;

obtaining the temperature of the resistance heater based on the calculated resistance value of the resistance heater and resistance-variation characteristics of the resistance heater relative to the temperature; and changing the duty ratio of the control signal based on a difference between the obtained temperature value of the resistance heater and a predetermined set temperature.

* * * * *